(12) United States Patent
Berry et al.

(10) Patent No.: US 12,210,718 B2
(45) Date of Patent: Jan. 28, 2025

(54) TIME-BASED METADATA MANAGEMENT SYSTEM FOR DIGITAL MEDIA

(71) Applicant: Adeia Media Solutions Inc., San Jose, CA (US)

(72) Inventors: Matthew G. Berry, Raleigh, NC (US); Tim Jones, Cary, NC (US); Isaac Kunkel, Cary, NC (US)

(73) Assignee: Adeia Media Solutions Inc., San Jose, CA (US)

( * ) Notice: Subject to any disclaimer, the term of this patent is extended or adjusted under 35 U.S.C. 154(b) by 0 days.

(21) Appl. No.: 16/155,633

(22) Filed: Oct. 9, 2018

(65) Prior Publication Data

US 2019/0107906 A1    Apr. 11, 2019

Related U.S. Application Data

(63) Continuation of application No. 12/905,520, filed on Oct. 15, 2010, now Pat. No. 10,095,367.

(51) Int. Cl.
| | |
|---|---|
| *G06F 3/048* | (2013.01) |
| *H04N 21/2343* | (2011.01) |
| *H04N 21/431* | (2011.01) |
| *H04N 21/472* | (2011.01) |
| *H04N 21/84* | (2011.01) |
| *H04N 21/845* | (2011.01) |

(52) U.S. Cl.
CPC ..... *G06F 3/048* (2013.01); *H04N 21/234363* (2013.01); *H04N 21/4312* (2013.01); *H04N 21/47217* (2013.01); *H04N 21/84* (2013.01); *H04N 21/8456* (2013.01)

(58) Field of Classification Search
CPC .... G06F 3/048; H04N 21/8456; H04N 21/84; H04N 21/47217; H04N 21/234363; H04N 21/4312
See application file for complete search history.

(56) References Cited

U.S. PATENT DOCUMENTS

| | | | | |
|---|---|---|---|---|
| 6,393,158 | B1 * | 5/2002 | Gould | H04N 5/76 375/E7.004 |
| 6,602,297 | B1 * | 8/2003 | Song | G06F 16/78 715/210 |
| 2003/0070183 | A1 * | 4/2003 | Pierre | H04N 21/4622 725/135 |

(Continued)

*Primary Examiner* — Andrey Belousov
(74) *Attorney, Agent, or Firm* — HALEY GUILIANO LLP

(57) ABSTRACT

Managing metadata associated with a digital media asset includes selecting the digital media asset, displaying the digital media asset in a filmstrip format that presents one or more scenes from the digital media asset along a timeline, wherein each scene corresponds with an underlying point in time along the timeline, and wherein the digital media asset has a start time and an end time that define the timeline, displaying at least one track in timeline alignment with the film strip format wherein the at least one track corresponds with a type of metadata associated with the digital media asset, and displaying on the at least one track, one or more segments, wherein each segment has a start point and an end point along the timeline and wherein each respective segment represents a span of time in which the type of metadata occurs within the digital media asset.

18 Claims, 14 Drawing Sheets

(56) References Cited

U.S. PATENT DOCUMENTS

| | | | |
|---|---|---|---|
| 2005/0005308 A1* | 1/2005 | Logan | G06Q 30/06 |
| | | | 725/135 |
| 2006/0036568 A1* | 2/2006 | Moore | G06F 16/168 |
| 2006/0236338 A1* | 10/2006 | Shimoda | G11B 27/322 |
| | | | 725/37 |
| 2007/0016599 A1* | 1/2007 | Plastina | G11B 27/34 |
| 2008/0244410 A1* | 10/2008 | Schormann | G06F 3/04886 |
| | | | 715/723 |
| 2008/0292279 A1* | 11/2008 | Kamada | G06F 16/7844 |
| | | | 386/244 |
| 2009/0055383 A1* | 2/2009 | Zalewski | G11B 27/10 |
| 2010/0031162 A1* | 2/2010 | Wiser | H04N 21/431 |
| | | | 715/747 |
| 2010/0107117 A1* | 4/2010 | Pearce | G11B 27/322 |
| | | | 715/790 |
| 2011/0299832 A1* | 12/2011 | Butcher | H04N 21/8547 |
| | | | 348/E5.062 |

* cited by examiner

| NAME | DESCRIPTION | RELATIONSHIP | TYPE |
|---|---|---|---|
| SERIES | NAME OF THE SERIES TO WHICH THE MEDIA BELONGS | PARENT OF SEASON | STRING |
| SEASON NUMBER | SEASON NUMBER WITHIN THE SERIES TO WHICH THE DIGITAL MEDIA BELONGS | CHILD OF SERIES; PARENT OF EPISODE NUMBER (NON-TIME BASED ATTRIBUTE FOR INSTANCE OF DIGITAL MEDIA) | STRING |

FIG. 4

| METADATA TYPE | DATA SCOPE | DATA ORIGIN |
|---|---|---|
| COMMON ENTITY-BASED | ENTITY-BASED | CONTENT OWNER |
| SYSTEM GENERATED ENTITY BASED | TIME-BASED | SYSTEM GENERATED |
| CUSTOM DEFINED ENTITY-BASED | TIME-BASED OR ENTITY-BASED | CUSTOM DEFINED |

FIG. 5

| NAME | DESCRIPTION | TYPE |
|---|---|---|
| TITLE | TITLE OF VIDEO | STRING |
| TITLE TYPE | TYPE OF VIDEO | STRING (DEFINED) |
| EPISODE NUMBER | EPISODE NUMBER OF THE VIDEO | STRING (NUMERIC) |
| ORIGINAL AIR-DATE | DATE THE VIDEO WAS FIRST AIRED OR RELEASED | DATE |
| SYNOPSIS | SUMMARY OR DESCRIPTION OF THE VIDEO | STRING |
| KEYWORDS | KEYWORDS ASSOCIATED WITH THE VIDEO | STRING |

FIG. 6

| NAME | DESCRIPTION | TYPE |
|---|---|---|
| CHARACTER | APPEARANCE OF A CHARACTER WITHIN THE VIDEO SEGMENT | STRING |
| LOCATION | LOCATION OF A SCENE WITHIN THE VIDEO SEGMENT | STRING |
| VIDEO BREAK | LOGICAL BREAK IN VIDEO (BLACK FRAMES WITH NO AUDIO) | LOGICAL |
| AD CUE | LOGICAL AD CUE POINT IN A VIDEO | LOGICAL |

FIG. 7

| NAME | DESCRIPTION | TYPE |
|---|---|---|
| US MPAA RATING | US MPAA RATING (I.E., G, NC-17, PG, PG-13, R, X); USED FOR RATING OF MOTION PICTURES | STRING |
| V-CHIP RATING | TV PARENTAL GUIDE (I.E., G, PG, TV-14, TV-G, TV-MA, TV-PG, TV-Y, TV-Y7, TV-Y7-FV); USED FOR RATING OF TV CONTENT | STRING |
| SIMPLE RATING | SIMPLE RATING GUIDE (I.E., ADULT, NON-ADULT); MISCELLANEOUS USAGE | STRING |
| NIELSEN RATING | NIELSEN RATING FOR THE DIGITAL MEDIA | STRING |

TIME-BASED METADATA MANAGEMENT SYSTEM FOR DIGITAL MEDIA

FIELD OF THE PRESENT INVENTION

The present systems and methods relate generally to the creation, manipulation, and analysis of metadata (i.e., information about information) associated with digital media, such as videos, movies, and TV shows, and, more particularly, to providing a computer-implemented system and interface to enable a system user to create, manage, and analyze all or selected segments or portions of such digital media using time-based or time-correlated metadata associated with the underlying digital media.

BACKGROUND OF THE PRESENT INVENTION

The growing prominence and value of digital media, including the libraries of full-featured films, digital shorts, television series and programs, news programs, and similar professionally (and amateur) made multimedia (hereinafter referred to generally as "videos" or digital media" or "digital media assets or files"), requires an effective and convenient manner of categorizing, managing, visualizing, and manipulating such digital media as well as any related or underlying metadata for a wide variety of purposes and uses. Metadata is merely information about the digital media, as a whole, or associated with particular images, scenes, segments, or other subparts of the digital media. For example, metadata can identify the following types of information or characteristics regarding the digital media, including things such as actors appearing, themes present, or legal clearance to third party copyrighted material appearing in a respective digital media asset. Metadata may related to the entire digital media (such as the title, date of creation, director, producer, production studio, etc.) or may only be relevant to particular segments, scenes, images, audio, or other portions of the digital media. Preferably, when such metadata only related to a subportion of the digital media, it has a corresponding time-base (such as a discreet point in time or range of times associated with the underlying time-codes of the digital media). Categorization and management of such metadata as it relates to digital media assets, particularly when such metadata can be tied closely to specific and relevant points in time or ranges of time within the digital media asset, can provide significant value to the content producers, advertisers, and other stakeholders; however, accurate creation of such metadata and determining what metadata to capture or use requires considerable investment of man-hours and use of computing technology. Further, existing means of using metadata remain deficient in effectiveness and reliability.

One example of a potentially difficult task in present digital media management systems is providing media for promotional campaigns surrounding new films or television programs. A studio may require one or more clips for distribution to various outlets to coincide with the appearance of an actor or actress on a television show to promote the film. Often, however, various constraints—such as the need to eliminate clips containing profanity or other mature material—may require the studio to carefully select among many possible clips. Alternatively, various legal matters may prevent a studio from widely distributing certain works through particular mediums, or before release of the film. For example, a studio may have limited rights to use a third party's musical score. Existing technologies in such a situation may require a studio representative to manually screen the bulk of a film, using his or her discretion to determine the most appropriate clip to provide for the promotional campaign given the various constraints.

Manual categorization, screening, and selection of digital media introduces obvious disadvantages to the system. Such disadvantages include human error, oversights, misunderstandings, poor exercise of discretion, or carelessness. Additionally, finding and selecting a digital media segment to comply with each of a variety of constraints requires repeated screenings of a work with the screener's attention simultaneously being pulled in numerous directions. Accordingly, existing methods of determining relevant characteristics of digital media require a considerable investment of time with a high likelihood that one of the constraints will be overlooked. For example, if the set of constraints requires that a segment contain a certain actress with a particular product placement in a specific geographic location, the likelihood that a mistake will occur, or that the optimal segment will not be selected, is high.

Therefore, a long-felt and unresolved need exists within the industry for systems and methods that enable the efficient processing, storage, display, and retrieval of desired digital media through the effective use of metadata, and preferably several hierarchical levels or layers of metadata, associated with digital media. Further, as stated above, it is highly desirable that such metadata pertain not only to the digital media as a whole, but with even more specificity down to specific points or spans of time within the particular digital media, for creating a more efficient and effective manner of analyzing such metadata and providing highly relevant or desired output. The present systems and methods provide a convenient graphical interface to enable a user to create, manage, and analyze all or selected segments or portions of such digital media using time-based or time-correlated metadata associated with the underlying digital media.

There is a further need for system and methods that enable the displaying, organizing, and managing of metadata associated with digital media. The system preferably first enables the ingestion and management of a master file containing information relevant to a respective digital media asset and related metadata (see, for example, U.S. Pat. No. 7,668,869, which is incorporated herein by reference), and then enables the display of all or selected portions or segments of the digital media asset and its underlying metadata on a computer implemented user interface. Preferably, existing metadata associated with the digital media can not only be analyzed, but additional metadata can be identified and created and associated with the relevant points in time or span in time in which the underlying metadata pertains to the digital media asset. Examples of metadata includes objects, persons, scenes, locations, products, or music present in a particular scene, segment, point in time, or span of time within the digital media. In preferred embodiments, at least some of the metadata is automatically ingested for a respective digital media asset associated with a customer or end user. The system and methods then preferably enable the customer or end user (or one affiliated with the customer or end user) to manage and analyze all or selected segments or portions of such digital media using time-based or time-correlated metadata associated with the underlying digital media. The system and methods also, preferably, enable the customer or end user (or one affiliated with the customer or end user) to create new time-based metadata, edit, or delete ingested or user-created metadata. Such creation and editing includes the ability to create not only top level tracks (or categories) of metadata, but also to create subtracks (or subcategories) or sub-subtracks (or sub-subcategories) of metadata in a hierarchical manner or arrangement and to associate the same with all or selected segments or portions of such digital media preferably in a time-based or time-correlated manner.

There are additional needs for systems and methods for displaying and managing metadata associated with digital media that enable such metadata to be classified into categories (or tracks) and further subdivided into increasingly more specific subcategories (or sub-tracks). The resulting categories and subcategories of metadata may then be analyzed or searched against using various filters and search techniques—for example, a user may be interested in viewing all instances of the appearance of an actor or actress in a particular geographic location, but only for which the user has clearance for all copyrighted material in the segment. By selecting the appropriate categories and subcategories in the manner described herein, the user can analyze and select among the relevant video segments for those segments that meet his or her requirements. The metadata is preferably temporally associated with the digital media, in that metadata segments comprise a point in time or span of time corresponding to the relevant time codes of the underlying digital media asset.

The application and uses of such systems and methods are varied and numerous. For example, an authorized user may select from a number of either predetermined categories and subcategories through which digital media may be filtered, applying multiple variables and obtaining reliable output—an appropriate film clip, for example, to be shown on several different television appearances by an actress, each appearance requiring a different set of constraints. Accordingly, not only is there a need for systems and methods that cost effectively eliminate man-hours in reviewing and selecting media segments, but also systems and methods that remove undesirable variables, such as human error.

The above needs and features, as well as additional aspects and business applications, are disclosed herein and will become readily apparent to one of ordinary skill in the art after reading and studying the following summary of the present inventions, the detailed description of preferred embodiments, and the claims included hereinafter.

SUMMARY OF THE PRESENT INVENTION

The present invention relates generally to the creation, manipulation, and analysis of metadata (i.e., information about information) associated with digital media, such as videos, movies, and TV shows, and, more particularly, to providing a computer-implemented system and interface to enable an authorized system user to create, manage, and analyze all or selected segments or portions of such digital media using time-based or time-correlated metadata associated with the underlying digital media. Briefly described, aspects of the present invention include the following.

In a first aspect of the present invention, systems and methods of managing metadata associated with a digital media asset are disclosed. Such systems and methods include selecting the digital media asset, displaying the digital media asset in a filmstrip format that presents one or more scenes from the digital media asset along a timeline, wherein each scene corresponds with an underlying point in time along the timeline, and wherein the digital media asset has a start time and an end time that define the timeline, displaying at least one track in timeline alignment with the film strip format wherein the at least one track corresponds with a type of metadata associated with the digital media asset, and displaying on the at least one track, one or more segments, wherein each segment has a start point and an end point along the timeline and wherein each respective segment represents a span of time in which the type of metadata occurs within the digital media asset.

The present invention also encompasses computer-readable medium having computer-executable instructions for performing methods of the present invention, and computer networks and other systems that implement the methods of the present invention.

The above features as well as additional features and aspects of the present invention are disclosed herein and will become apparent from the following description of preferred embodiments of the present invention. In addition, other systems, methods, features and advantages will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Further features and benefits of the present invention will be apparent from a detailed description of preferred embodiments thereof taken in conjunction with the following drawings. The components in the drawings are not necessarily to scale, emphasis instead being placed upon clearly illustrating the principles of the present invention. Further, in the drawings, it should be noted that like reference numerals designate corresponding parts throughout the several views, and wherein:

FIG. 4 is a table showing an exemplary reporting group hierarchy as used in the system of FIG. 1;

FIG. 5 is a table showing types of metadata used by the system of FIG. 1;

FIGS. 6-8 illustrate specific examples of the different types of metadata described in FIG. 5;

DETAILED DESCRIPTION OF PREFERRED EMBODIMENTS

Generally, the systems and methods described herein include and are implemented within a computer system having one or more databases and other storage apparatuses, servers, and additional components, such as processors, terminals and displays, computer-readable media, algorithms, modules, and other computer-related components. The computer systems are especially configured and adapted to perform the functions and processes of the present system as described herein. Further, any results or outputs relating to classification of digital media files may be stored in a database, output as an electronic or printed report, displayed on a computer terminal, or otherwise delivered to a system operator or user for analysis, review, and/or further processing. As described herein, the system is shown in an exemplary environment in which the system interacts with one or more authorized users. An authorized user is typically associated with a corporate entity or company, such as a movie or television production studio, an advertising agency, an internet web service content provider, or other similar entity, that has permission to access specific digital media content and, in some cases, to create or edit metadata content associated with a respective digital media asset.

Figure 1:
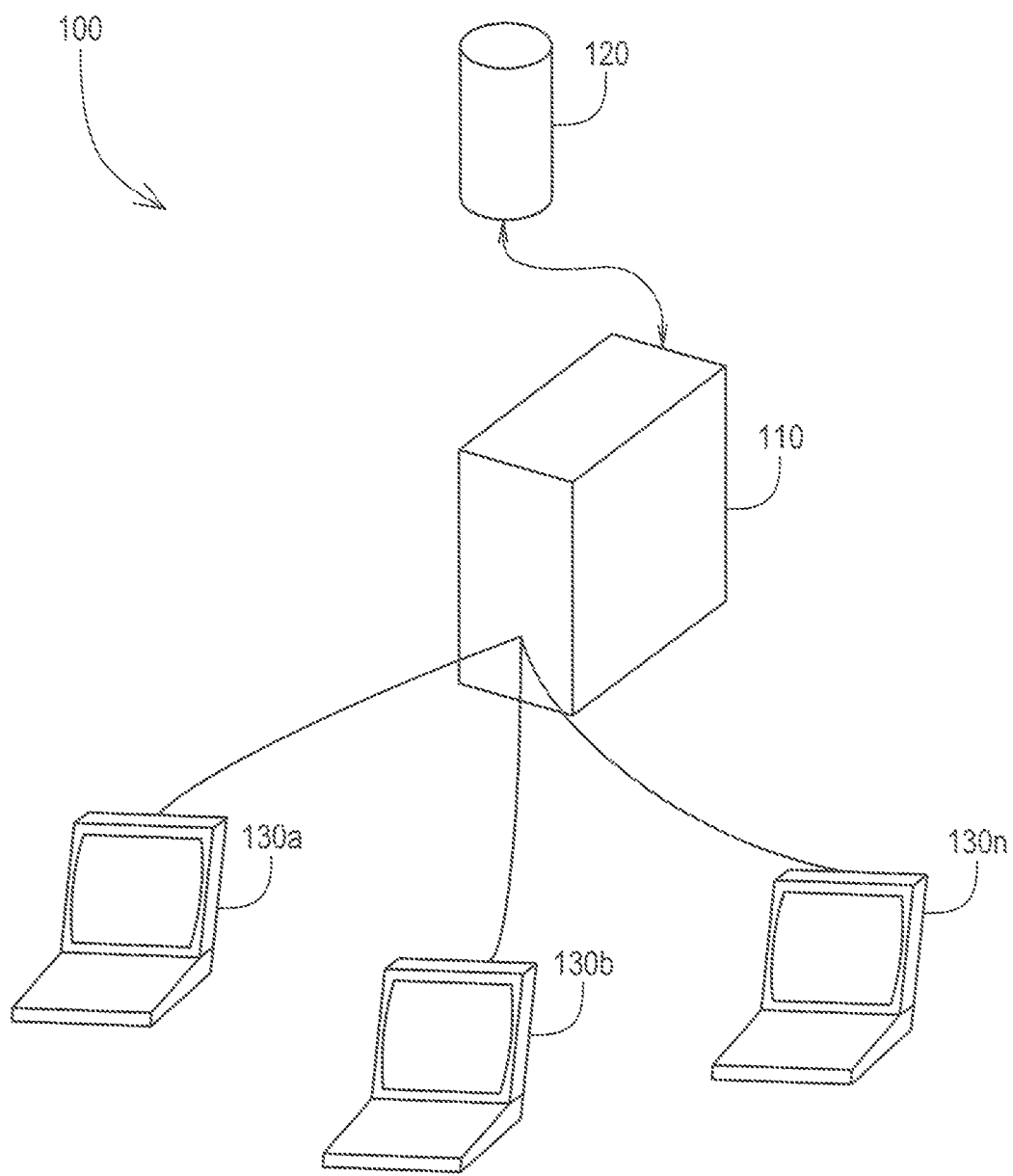
FIG. 1 is a system view of a preferred embodiment of the present invention.

As shown in FIG. 1, in one preferred embodiment, the time-based metadata management system 100 includes a digital media and metadata management server 110, which is in electronic, bi-directional communication with one or more digital media and metadata databases 120. The server 110 is accessible to authorized users (not shown) from terminals or other standalone computers 130a, 130b, . . . , 130n that are networked directly, indirectly, wirelessly, over the Internet, or otherwise with the server 110 in conventional manner. The server 110 includes conventional processors, memory, I/O capabilities and components, and programming modules and/or computer readable media that enable performance of the functions and operation of the system as described herein. The databases 120 may be implemented in one or more hardware components and may be located locally and/or remotely from the server 110, again, in conventional manner. The databases 120 preferably stored, in electronic format, the digital media assets or files that are accessed and used within the system 100. In addition, the databases 120 preferably include corresponding metadata files or data associated with each of the respective digital media assets.

Digital media assets will typically be associated with (or owned by) a particular customer or user (not shown). The stored digital media assets preferably include, but are not limited to, movies, television programs, music videos, short clips, cartoons, commercials, internet-created videos, and other similar types of multimedia files or data. The digital media assets are embedded with or have associated therewith (in other known manners, such as headers, related files, etc.) conventional metadata corresponding to typical elements of content of the digital media, such as title, director, producer, year of creation, genre, actors or characters, basic plot synopsis or summary, audio, closed-caption text, and other similar media attributes commonly associated with conventional digital media. The assets may be loaded to the database having already been embedded with such metadata, or the system 100 may assign metadata attributes to the content of the digital media as part of an ingestion process (see, for example, U.S. Pat. No. 7,668,860).

Within some embodiments of the present system, an ingestion server extracts metadata from the digital media and stores the metadata in the database 120. The metadata is preferably maintained in the form of metadata files that are associated with their respective digital media asset. Thus, the database preferably includes a separate metadata file for each digital media asset in the database, such that each metadata file includes all of the metadata for its respective digital media asset. Generally, the metadata includes identifiers or tags that provide descriptions and/or identification means for each item of metadata. For example, an identifier for metadata signifying a particular actor could be the actor's name. The identifiers or tags may describe a basic understanding or provide a detailed description of the associated digital media asset. The metadata identifiers enable the metadata to be easily located and utilized within the system. In preferred embodiments, additional metadata is either included with ingested digital media or is created as part of the ingestion process in known manner. Such additional metadata may include more details about the digital media, such as setting, scenery, products appearing, etc.

Preferably, the metadata is time-coded, such that each type of metadata is associated with a time-code or range of time-codes associated with the time codes of the respective digital media asset. For example, an item of metadata for a certain actor in a film may indicate that the actor is on screen in the film from the 2 minute, 36 second mark of the video to the 4 minute, 41 second mark, and then does not appear in the film again. Another item of metadata may indicate that an object within a film, such as a car, is seen multiple times throughout the film, and at varying time-codes. Some metadata may even be associated with the entire film, such as metadata associated with the overall subject matter of a film, or with the title of a film.

Although a customer may provide digital media already embedded with metadata or having an associated metadata file or header, additional metadata may also be automatically identified and/or created when the digital media asset is ingested by the system 100 and stored in database 120. For example, recently-developed technologies utilize facial recognition technology, textual analyzers, sound and pattern recognition technology, and other similar mechanisms to identify components within the digital media, and then associate automatically those identified components with metadata attributes, along with the appropriate time codes, corresponding to the time codes of the digital media. Metadata may also be associated with assets manually, for example by having a person view a film and associate metadata with items recognized by the viewer. One exemplary method for associating metadata with videos is described in U.S. Patent Publication No. 2004/0237101 to Davis et al., entitled "Interactive Promotional Content Management System and Article of Manufacture Thereof," which is incorporated herein by reference in its entirety and made a part hereof. Once metadata has been associated with content components of a respective digital media asset, it is preferably extracted and stored in the database 120 for further use within and by the system, as described in greater detail hereinafter.

Once the metadata is associated with a respective digital media asset, and an asset database 120 has been provided or made accessible to the system 100, an authorized user is then able to utilize the systems and methods described hereinafter further to manage, manipulate, view, analyze, create, edit, delete, or otherwise make use of the metadata associated with a respective one or more digital media asset accessible by the digital media management system 100, as described herein.

In summary, the system 100 described herein is generally used for managing time-based metadata for digital media assets. The system provides a user interface accessible to authorized users (not shown) from terminals or other standalone computers 130a, 130b, . . . , 130n, includes supporting methods and processes performed by modules or components of the server 110 in communication with the database 120 and user computers 130 for creation, maintenance, and recall of time-based metadata for such digital media.

The system provides support for multiple types of information including common attributes of digital media typically provided by the owner of such digital media, in addition to system-generated time-based metadata, and custom-defined tracks of time-based metadata that may be created and edited by authorized users of the present system.

Metadata Schema Overview

The system provides support for managing digital media and its underlying metadata. This is preferably done through the storage and manipulation of segments of the digital media asset. Segments that designate a span of time in a video, such as character appearances, scene boundaries, video breaks or ad cues, are collected together in groups known as tracks. An asset can have multiple metadata tracks that each span several different types of data, but can be stored and represented in a consistent manner. As illustrated in the relationship model diagram 200 of FIG. 2, the time-based metadata management system makes effective use of two classes of metadata: MetadataSegments 210 and MetadataTracks 250. The system 100 uses a flexible data manager component that can accommodate a wide variety of data structures and business rules for managing, creating, and editing metadata and metadata types and relationships.

Figure 2:
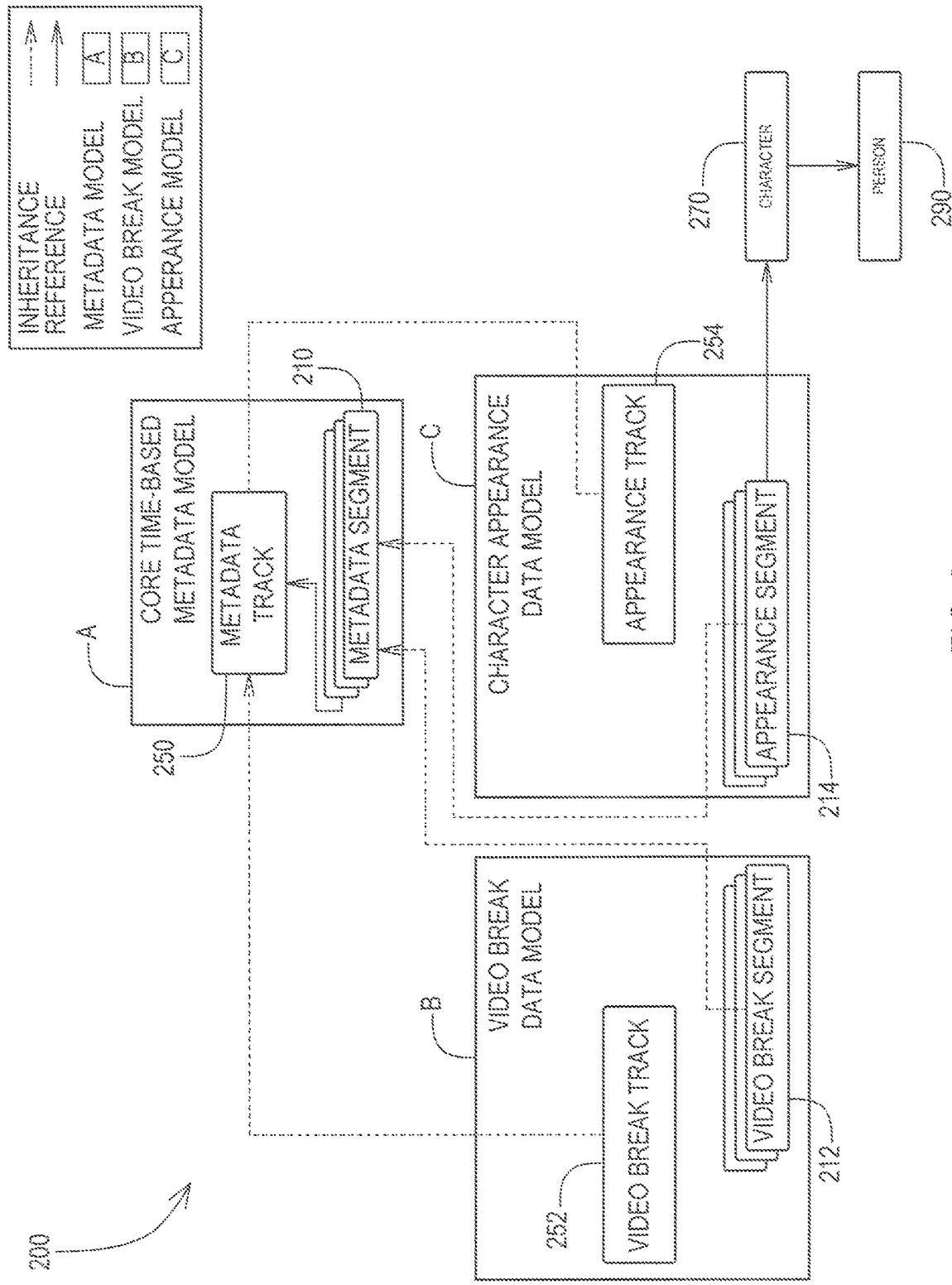
FIG. 2 is a schematic illustration showing the relationship between tracks and segments as described herein.

A MetadataSegment 210 (hereinafter also referred to merely as a "segment") identifies or defines the point in time or span of time for a particular type of metadata. Examples of a segment include the span of time in which a character 270 (or particular actor 290 associated with such character 270) appears in a scene or where a copyright owner owns the digital or audio rights to distribute or use a portion of a particular digital media asset. Any information that can be represented as a duration or instant in time can be represented as a segment. For example, FIG. 2 illustrates two specific types of segments, VideoBreakSegments 212 and AppearanceSegments 214. As will become apparent hereinafter, any particular segment for any particular digital media asset may be created, edited, or deleted by an authorized user (or automatically by ingest components) within the system.

A MetadataTrack 250 (hereinafter also referred to merely as a "track") represents the timeline (the entire range of time codes) that spans the entire duration of a video or digital media asset and is used as a platform to contain and visually display where and when, within the digital media asset, a collection of segment(s) 210 associated with that particular track 250 occur. For example, FIG. 2 illustrates two specific types of tracks: VideoBreakTrack 252 and AppearanceTrack 254. The VideoBreakTrack 252 is populated by one or more underlying VideoBreakSegments 212; correspondingly, the AppearanceTrack 254 is populated by one or more underlying VideoBreakTracks 214.

Figure 3:
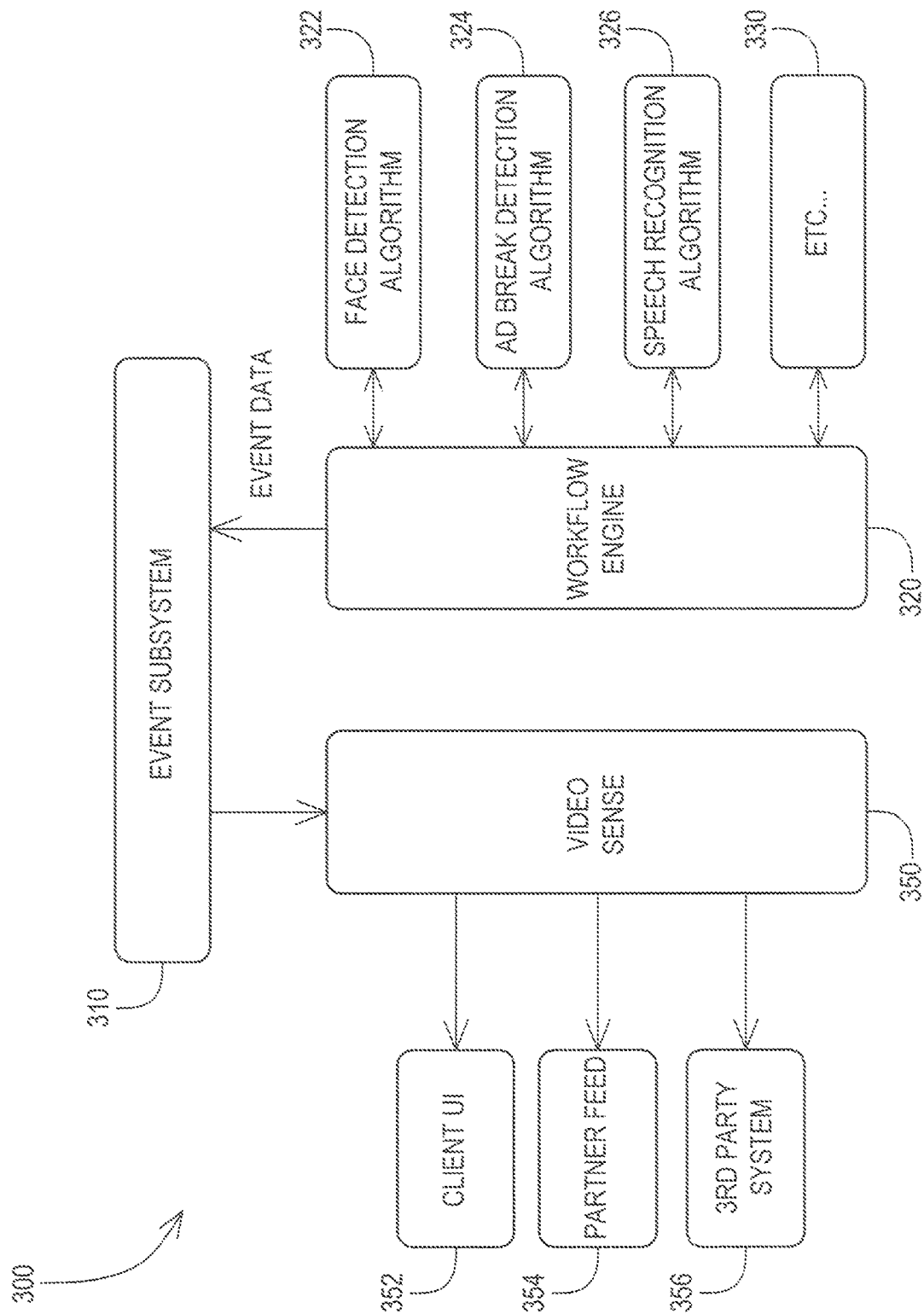
FIG. 3 is a schematic illustration showing how metadata is input into the system of FIG. 1.

Each respective track, and its underlying segment(s), can be populated, as shown in the metadata creation diagram 300 of FIG. 3, in a wide variety of ways. For example, for a specific digital media asset, event subsystem 310 enables metadata to be automatically generated and obtained by workflow ingest engine 320, which has access to a wide variety of automated modules for identifying and creating time-based metadata, including face detection algorithm modules 322, ad break detection algorithm modules 324, speech recognition modules 326, and other automated modules 330. The metadata management system 350 also enables metadata to be added to or appended to a specific digital media assets. Such metadata may be entered by an authorized user of the system through user interface 352, which will be described in greater detail hereinafter, or may be fed into the system from metadata 354 already created by the owner of the digital media or metadata 356 provided by any 3rd party system. Such metadata fed into the system is preferably provided in XML format. Regardless of how the metadata gets into the system, it is displayed in a consistent manner to an authorized user, as will be described in greater detail hereinafter. For example, individual segment(s) support a pluggable business logic implementation so that additional information and business rules can be applied to a specific type of track without impacting other types of track(s).

Reporting Groups

The system 100 supports a hierarchical representation of a digital media asset such that logical relationships between the asset in a customer's library can be depicted visually. Metadata that is defined, stored, and used to organize the media are represented as special attributes called "Reporting Groups." Reporting Groups are user defined and are used to organize the media as the content owner defines and can be used to add other business value in terms of finding and reporting on the digital media. FIG. 4 provides an example 400 of a Reporting Group hierarchy definition for a standard Television Series, such as the name of the series and the season number, which is a subset of the series, and which, in turn, contains a plurality of episodes (not shown), which are subsets of each season number.

Metadata Support

The system provides support for multiple types of metadata, including common attributes of the digital media asset (typically) provided by the owner of the asset, system generated metadata, and custom-defined metadata. Common attributes of the digital media asset are typically provided by the owner of the digital media or generally associated with the digital media and may either be time-based or representative of information relevant to the entire digital media asset. System generated metadata and custom-defined metadata may be either time-based or relevant to the entire digital media asset and may be generic or applicable to all types of digital media and customers or they may be customized and uniquely created for the specific customer. FIG. 5 is a table 500 that displays the various types of metadata that are supported by the system, the scope of the data, and origin of the data. The scope of the data can be entity-based (attribute relative to the entire asset) or time-based (attribute relative to either a specific point or segment of time within the asset).

FIG. 6 is a table 600 that provides examples of entity-based metadata that are supported by the system and commonly available from the owner of the digital media. These elements are related to general information about the digital media, such as Title, Type of Asset (film, TV program, music video, etc.), Episode Number, Original Air Date, Synopsis or Summary of the asset, and Keywords.

FIG. 7 is a table 700 that provides examples of time-based system-generated metadata that are supported by the system. These elements are generated and managed through the system and include, by way of example, metadata such as Character, Location, Video Break, and Ad Cue.

Figure 8:

FIG. 8 is a table 800 that provides examples of custom-defined metadata that can be either time-based or entity-based metadata that can be supported by the system. This table 700 is merely one example of such data and shows that various standards of ratings, such as US MPAA Rating, V-Chip Rating, Simple Rating, or Nielsen Rating, could be defined and managed within the system.

User Interface (Embodiment 1)

Figure 9:
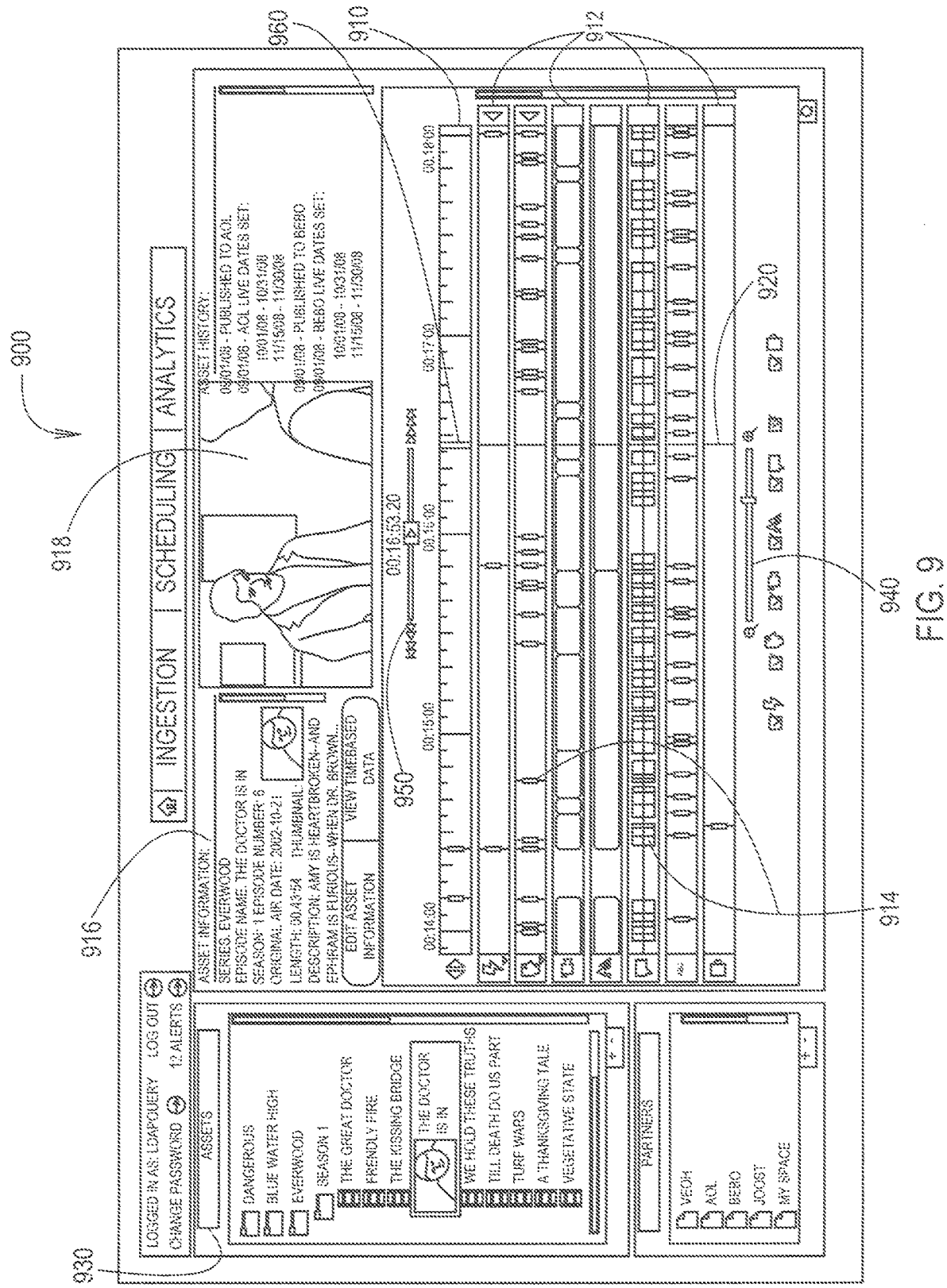
FIGS. 9-11 illustrate various screen shots of one embodiment of a user interface for use with the system of FIG. 1.
Figure 10:
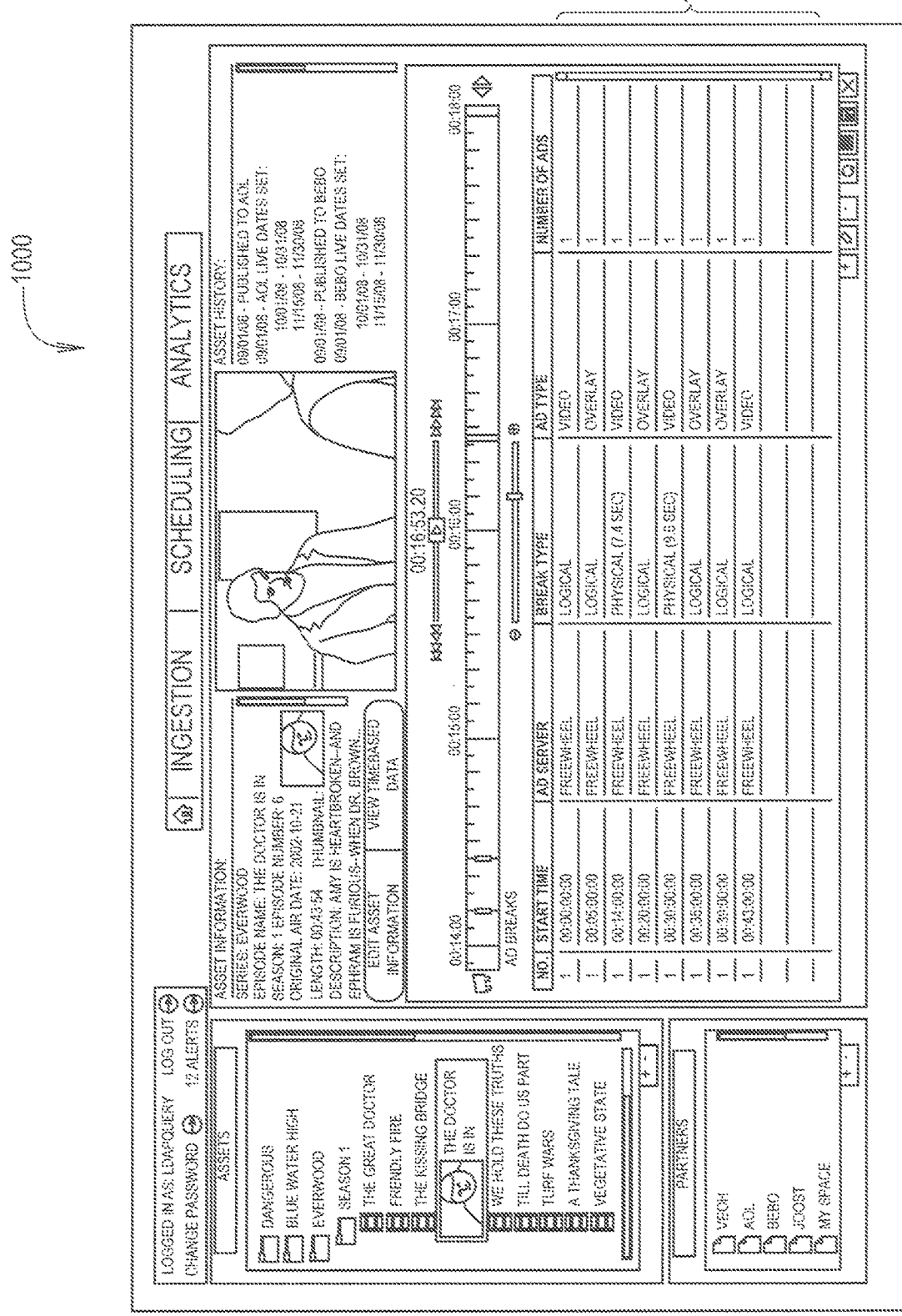
Figure 11:
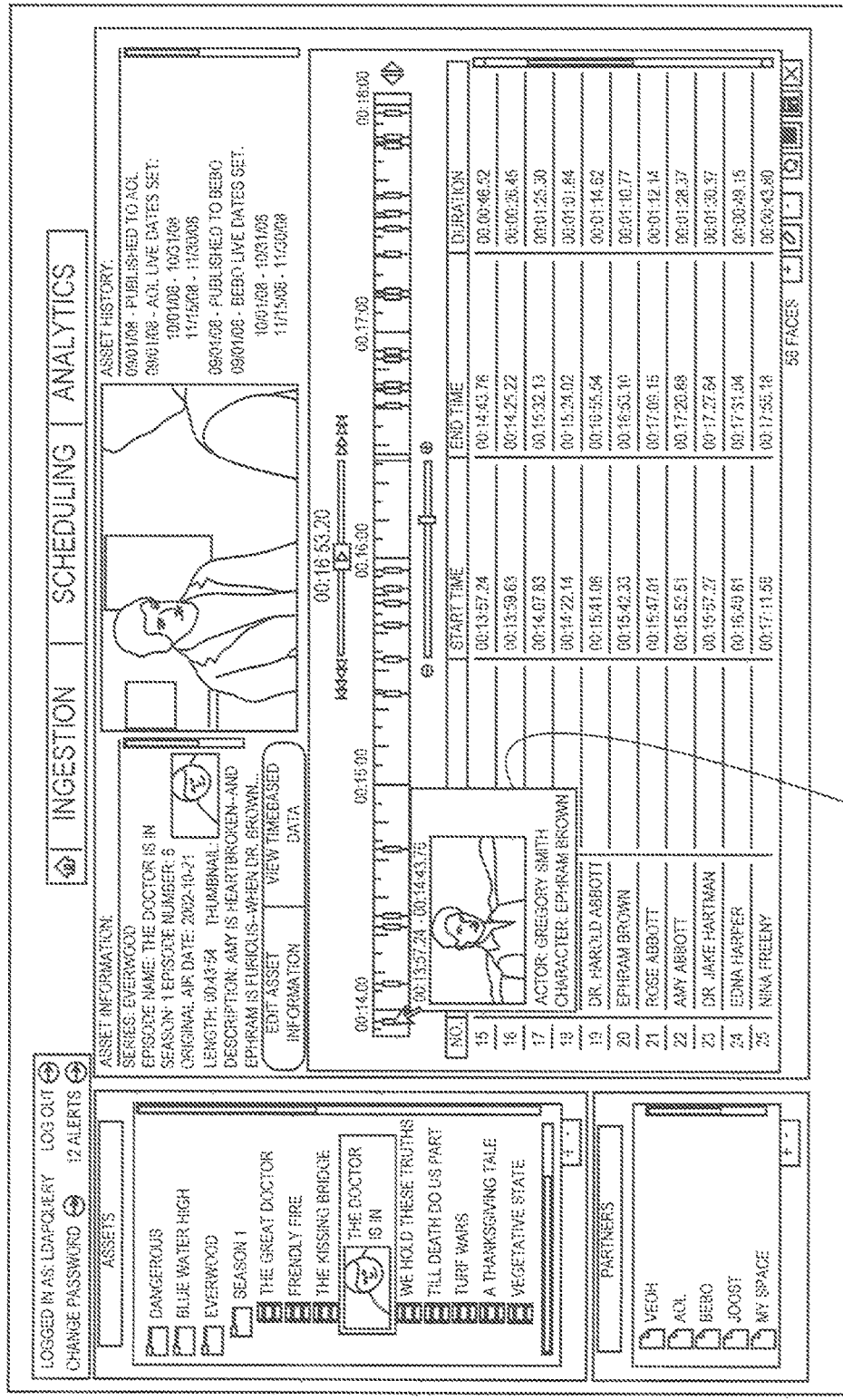

FIGS. 9-11 illustrate one embodiment of a user interface 900, 1000, and 1100 that enables an authorized user to view a specific digital media asset and to create and manage tracks and segments of metadata associated with such asset. As previously stated, the user interface 900 provides a time line 910 approach for viewing the time-based metadata to allow for the management of the data along said time line. The interface 900 allows the user to view and/or select specific tracks 912 of interest to manage them as a group along the same timeline and enabling the user to see and manage logical and time relationships between the distinct tracks 912. Segments 914 are shown as lines or blocks of time along each track 912. Non-time-based, common attributes about the video asset are displayed in panel 916. The actual video is displayed in player panel 918, and the current time location of the scene being shown in panel 918 is designated by marker 920 along the timeline 910 and cutting across each of the tracks 912.

The authorized user has control of the metadata presentation by selecting the video of interest from panel 930, selecting the tracks 912 of interest, and managing the metadata along each track 912. Additionally, the system provides the user the ability to zoom in or zoom out using zoom scale 940. The user is also able to slide along the time line using controller 950 or by clicking and dragging time bar 960. As the user pans across the video timeline, the individual metadata tracks stay on the same time line.

As shown in user interface 1000 of FIG. 10, the user is provided the ability to view the data for an individual track in tabular form 1010, making it easier to see and manage the relationships of the various segments of data along a distinct track. As shown in FIG. 11, selecting a particular metadata type and then double clicking on a specific point in time in user interface 1100 opens an additional window 1110 that displays the relevant point in time within the digital media asset in which the selected metadata segment occurs.

User Interface (Embodiment 2)

Main Interface

Figure 12:
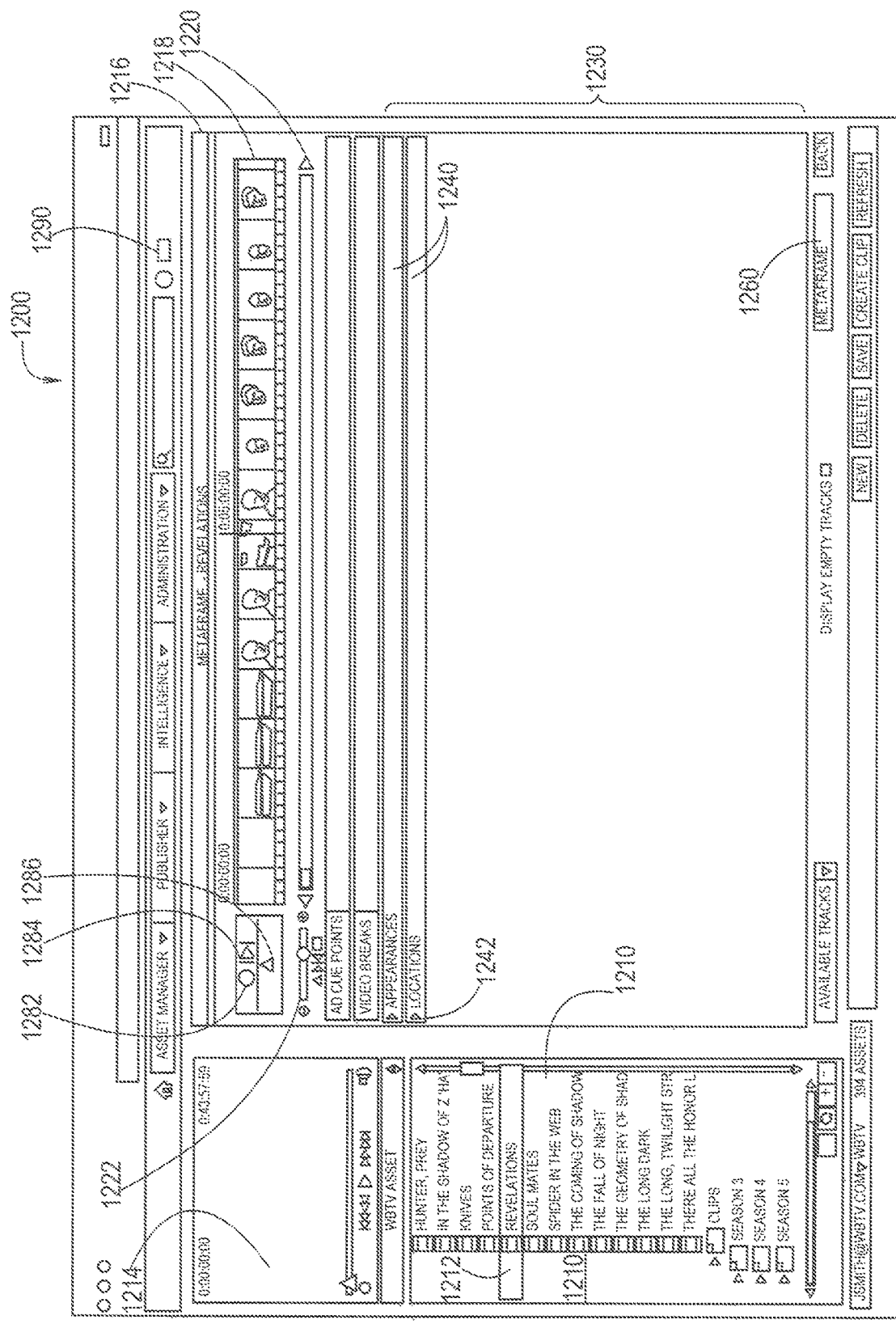
FIGS. 12-16 illustrate various screen shots of another embodiment of a user interface for use with the system of FIG. 1.

FIGS. 12-16 illustrate screen shots of another embodiment of a user interface associated with the present system. FIG. 12 illustrates user interface 1200, which is divided into a number of different panels or windows. Panel 1210 includes the list of digital media assets available for viewing and managing by the authorized user. The list of digital media assets is preferably displayed in a traditional folder→file→subfile hierarchical format, such as, for example, TV Series→Season→Episode format. The digital media asset that has been selected, specifically, by the authorized user is shown by highlight 1212. The selected asset will be displayed visually in video player panel 1214. The video player includes traditional player functionality (play, pause, stop, fast forward, reverse, advance to next scene, reverse to previous scene buttons), volume control, timeline slider, plus a current time code location of the current scene (displayed in the upper left of the player screen) and the ending time code (displayed upper right of player screen), which represents the total hours, minutes, and seconds of the selected asset. The title of the selected asset is displayed in title bar 1216. The digital media asset is also displayed in a filmstrip format along panel 1218. The filmstrip include a series of standard sized thumbnail scenes associated with the asset and representative of one or more scenes that fall between the start and stop time points under the relevant thumbnail scene. The user interface 1200 includes a timeline slider 1220 to enable the user to move the filmstrip forward or backward in time. Zoom control 1222 enables the user to zoom in or zoom out along the filmstrip.

Metadata tracks are shown in panel 1230. A track is a visual representation of a specific data type with time parameters. Time-based metadata can be either a single point with a specific time or a segment with a start time and an end time. Each track is preferably defined from a set of pre-defined track types, although, as will be discussed herein, new tracks and types can also be created by the user. Preferably, some tracks are "read-only", such as faces and locations, and are protected from editing or modification by the user. Other tracks, such as ad breaks and video breaks, are typically selectable and editable by the authorized user.

Displayed tracks 1240 typically fall into two categories: top-level tracks and subtracks. Top-level tracks may (but do not have to) have subtracks and can be expanded by clicking on the arrow 1242 next to its name.

Figure 13:
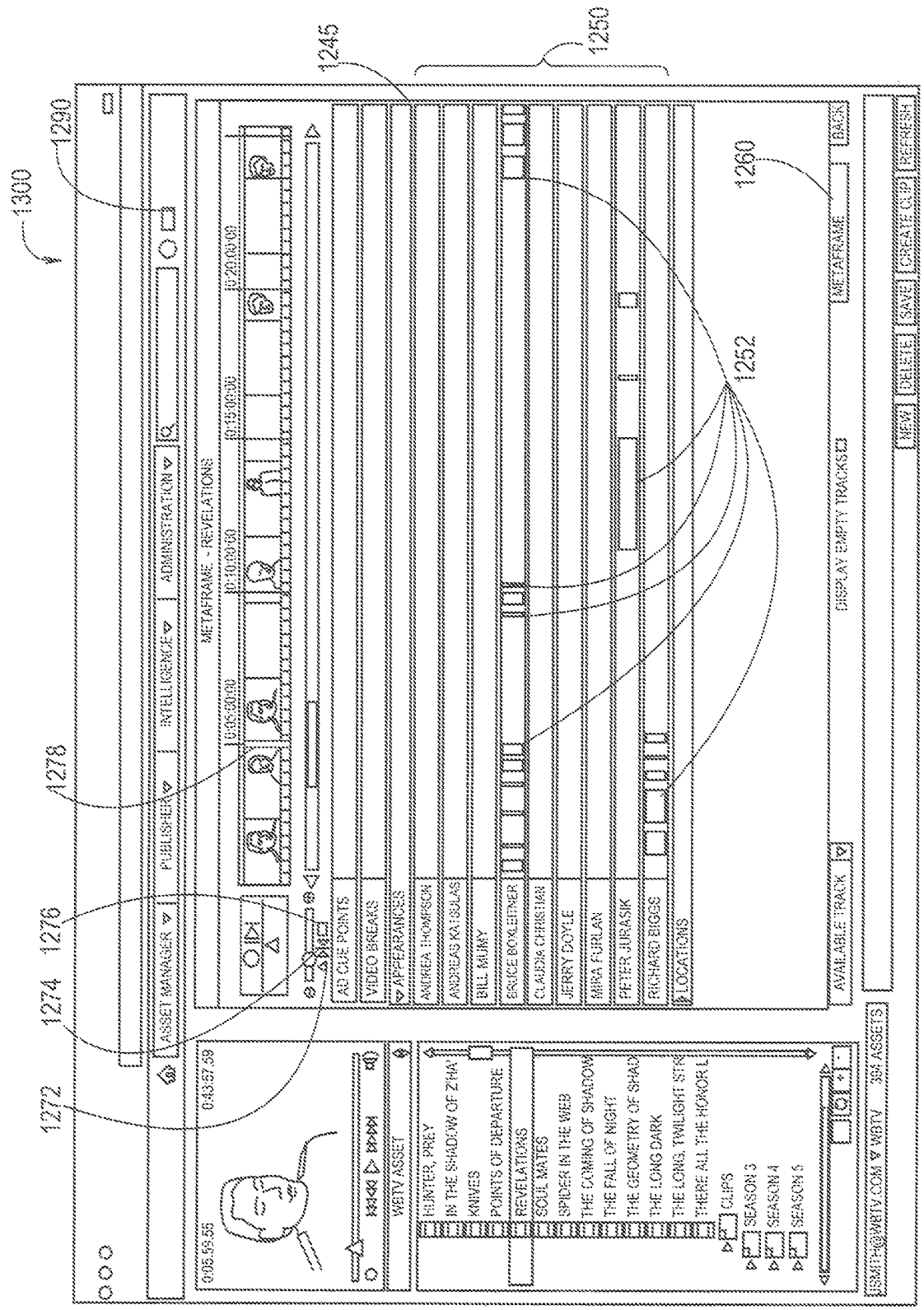

As is more easily seen in FIG. 13, in each single track, segments 1252 are displayed that reflect the location of metadata already created on the asset. For example, as shown in FIG. 13, this particular asset has an "Appearance" top-level track 1245. Expanding this track will show all of its subtracks 1250, each of which is associated with a specific actor. Segments 1252 should correlate with the respective actors "on screen" appearance within the asset.

From this user interface 1300, there are several ways an authorized user can view or modify content. For example, once an individual track has been selected and expanded, the user can select a particular subtrack. Once a subtrack (e.g. an Actor's name) has been selected, the user can perform several actions:

To quickly add segments for the selected tracks, the user can double click on the filmstrip.

If the user clicks on a particular existing segment, that segment will appear highlighted in the filmstrip. Once it is highlighted, the user can change the in/out points of the segment (see "Setting Segment In-Out Points" below).

If the user double clicks on a track name, the user will navigate immediately to the Track Editor interface view 1400 (discussed in greater detail hereinafter with reference to FIG. 14) for that track. This will allow the user to focus on content for that track (see section on "Track Editor" below).

Track Editor

Figure 14:
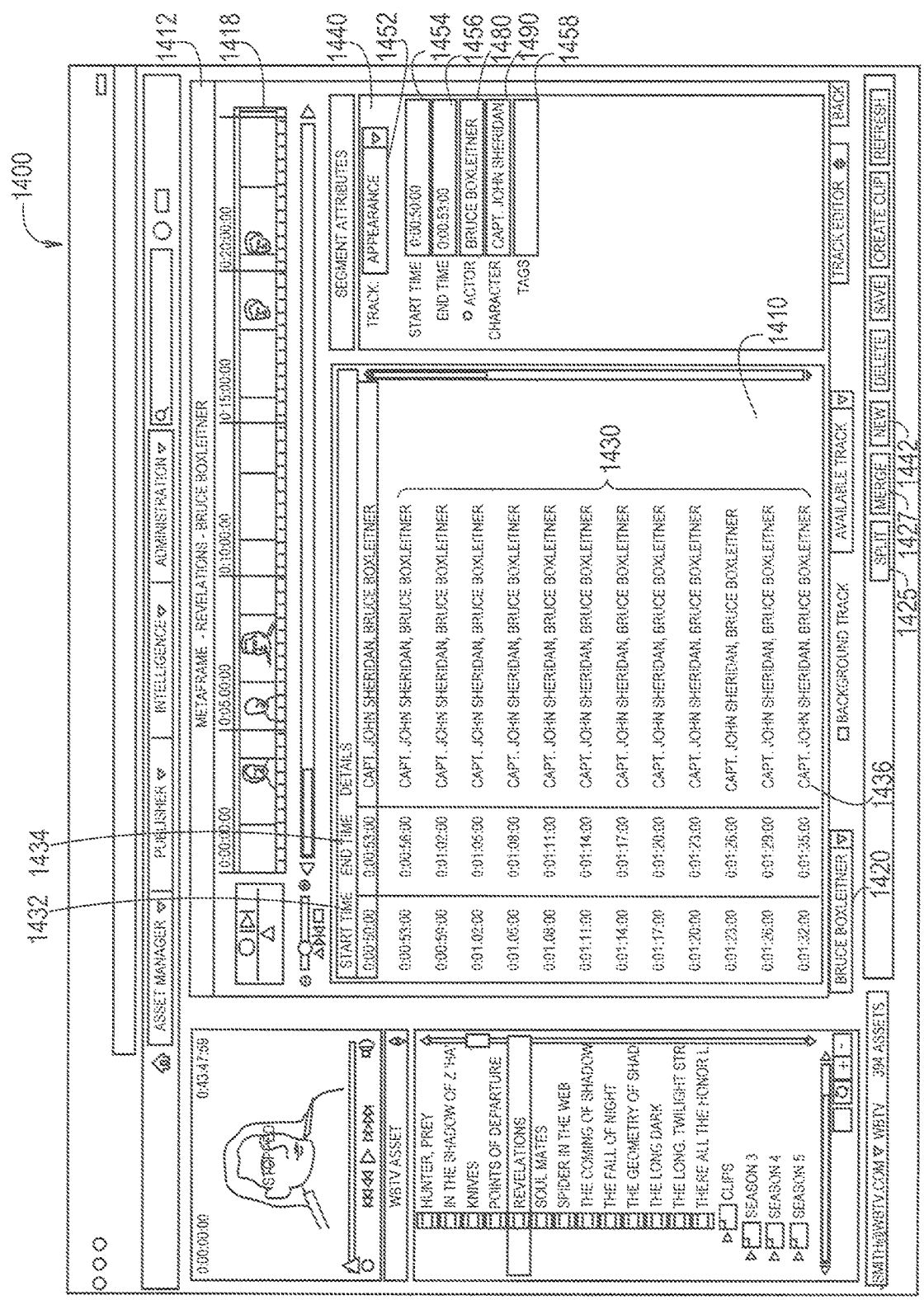

The Track Editor view 1400, as shown in FIG. 14, enables the user to view/edit all the tracks of a certain type for the selected asset. When the user first enters the Track Editor view 1400, a list of one type of metadata is displayed in panel 1410. The specific metadata that is displayed is identified in the title bar 1412. There are a few primary ways to navigate to the Track Editor interface 1400. The first is to double click a track 1240 or 1250 from the main interface 1200, 1300. This will switch the screen to the Track Editor view 1400 and automatically load the selected track. Another way is to choose the Track View from the drop down menu 1260 in the bottom right of the main user interface 1200, 1300.

Once in Track Editor view 1400, the user can change which Track (segments) the user is viewing. This can be done via the pull down menu 1420 in the bottom left of panel 1410. The top level of this menu 1420 preferably includes all of the available top level tracks. Once the authorized user finds the desired top-level track, the user can then select a specific subtrack to view, if desired. Once the track (or subtrack) has been selected, all of the segments 1430 for that track or subtrack are displayed in panel 1410. For each of these segments, the Start Time 1432, End Time 1434, and key properties 1436 are displayed.

If desired, the user can select any one of the segments 1430 in the list for editing. This can be done in a few ways. For example, after selecting a particular segment, the user can edit the properties in the Segment Attributes Panel 1440 to the right side of the display 1400 (see section on Segment Attributes Panel below). Alternatively, the user can also change the start and end time visual cues by adjusting the segment in and out points directly and graphically in the filmstrip 1418 above. To change the in/out times for your segment, follow these steps:

1. For case of use, the user can select the "Lock Zoom to Segment" button (below the zoom bar, next to the filmstrip) and then:
2. Click the desired segment in the list view 1410 for editing. Doing so will cause the filmstrip 1418 to highlight the selected segment. NOTE: Depending on the length of your segment, it may be necessary to zoom in or out to get a better view of the segment.
3. Click and drag on the left edge of the highlighted segment in the filmstrip 1418 to modify or move the Start Time point for the selected segment. The left and right arrows on the timeline can be used to provide a more precise movement of the Start Point for the selected segment.
4. To modify or move the End Point for the selected segment, click and drag on the right edge of the highlighted segment in the filmstrip 1418. Again, the left and right arrows on the timeline can be used to provide a more precise movement of the End Point for the selected segment.

Scene Builder

Figure 15:

The Scene Builder interface 1500 is shown in FIG. 15. This view 1500 allows the authorized user to create rich, time-based metadata across a particular time segment of the selected asset. For example, if the user wants to tag all of the items (people, objects, moods, music, etc.) in each scene of a movie, this is the best interface 1500 to use for that task.

The Scene Builder interface 1500 allows the user to tag all of the content in a particular time segment. The time segments that used in this interface are referred to as "anchor segments." By default, an anchor segment initially is set to 5 minutes. With the anchor segment set at 5 minutes, the user is able to go through and manually mark selected content as it is identified in each 5 minute slice of the asset. However, there are numerous other options for use of or selection of an anchor segment. For example, any existing track can be used as an anchor segment, or the user can choose a desired time, such as 1 minute, 5 minutes, etc. as the size or time frame for an anchor segment. The anchor segment can be selected from the pull down menu 1520 in the bottom left of the interface. It is most common to use either a time or a segment, such as shot or scene, in the scene builder. The specific example below assumes that a "scene" has been selected as the desired anchor segment.

When a new anchor segment is selected, the Scene Builder interface 1500 immediately presents the user with the first occurrence of the selected anchor segment. For example, if the user selects "scene," then the Scene Builder interface 1500 presents the user with the first scene of the asset.

Once an anchor segment has been selected, the segment list 1510 shows the user all of the current segments that overlap with that anchor segment. For example, if "scene" is selected as the anchor segment, the user should see all segments that appear in the first scene.

If the user selects any of the specific segments in the list 1510, the user can modify that segment in one of a few different ways. First, the user can modify its properties in the Segment Attributes panel 1540. Alternatively, the user can select a segment and use the filmstrip 1518 to modify the in-out points for that segment. To modify the segment, the same types of steps can be followed that were used in the Track Editor.

Adding Segments

The user interface enables a user to add time-based metadata to any asset in the system. There are several ways to add new time-based metadata segments to a selected asset:

1. In the main user interface 1200, 1300 (see FIGS. 12 and 13), the user can add a new segment by double clicking on the filmstrip 1218. This will add a new segment in the track that has been selected.
2. In the Track Editor view 1400 (see FIG. 14), the user can add a new segment in a similar manner by double clicking on the filmstrip 1418. This will create a new segment in the current track. Reminder: The current track is identified in the title bar 1412.
3. In the Track Editor view 1400 (see FIG. 14), the user can also add new segments by hitting New (or equivalently, typing '+') button 1442. This will switch the authorized user to the Segment Attributes panel 1440 where the user can also set the properties for the new asset. See the section on Segment Attributes Panel below.
4. In the Scene Builder view 1500 (see FIG. 15), the user can add a new segment by pressing the New button 1542 (or typing '+'). This will create a new segment that initially will have the same length as the current Scene Builder anchor segment. As with Track Editor, the user will be able to set the properties of the segment in the Segment Attributes panel 1540.

In all of these cases, the user can more accurately set the start and end points for the segment by following the directions in the section Setting Segment In-Out Points, set forth in greater detail below.

Editing Controls

This section provides a basic orientation on the buttons and keyboard shortcuts for the main user interface 1200, 1300. The magnification slider 1222 controls the level of magnification that the user has for viewing an asset timeline. The further to the right that you move, the greater the magnification. Moving to the left, reduces the magnification. Moving all the way to the left will show the entire asset on the filmstrip 1218. The small icons below the slider 1222 allows the user to specify the behavior of the zoom. Those three buttons from left to right are:

Lock Zoom to Playhead 1272—When zooming in or out, this option will keep the filmstrip centered on the playhead (i.e. the current play start point) 1278.

Lock Zoom to Center 1274—When zooming, clicking this option will keep the middle point of the digital media asset in the center of the displayed filmstrip 1218.

Lock Zoom to Segment 1276—This option allows the user to specify that the currently selected segment should remain in the middle of the filmstrip 1218, even as you zoom in and out.

Button Controls

In the upper left of main user interface 1200, 1300 are three buttons with special functions. These three buttons are as follows:

The red circular button 1282 records from the current play location, and is useful when creating new segments.

Directly next to this button 1282 is a button 1284 which allows the user to play the currently selected segment.

Underneath these two buttons is a button 1286 that lets the user locate the playhead 1278. In some situations, the playhead 1278 may move out of the current view within the filmstrip 1218. This button 1286 will allow the user to jump the filmstrip 1218 to the exact location of the playhead 1278.

Mouse Controls

This section briefly describes some of the operations the user can complete with the mouse:
1. Click on Segment—Selects a segment.
2. Double-click segment (in main user interface 1200, 1300 view)—Opens up Track Editor that matches the selected segment and allows the user to edit that segment.
3. Double-click empty space on filmstrip—Creates a new segment.
4. Click and drag on a segment—Moves the segment.
5. Click and drag the right or left edge of a segment—Adjusts just the start or end time of the segment. See "Setting Segment In-Out Points" below for more detail.

Keyboard Controls

There are several keyboard control provided to maximize efficiency when using the present system. These options are preferably viewable by clicking the keyboard icon 1290 in the upper right of the main user interface 1200, 1300.

Useful Keyboard Shortcuts include:
→ (Right)—Pan playhead right frame-by-frame. Pans faster if held down.
← (Left)—Pan playhead left frame-by-frame. Pans faster if held down.
i—Selects current playhead as in-point (left-point) of segment.
o—Selects current playhead point as out-point (right-point) of segment.
]—Selects next segment in current track.
[—Selects previous segment in current track.
, (comma)—Selects current segment's left edge.
. (period)—Selects current segment's right edge.
; (semi-colon)—Pans timeline left.
' (apostrophe)—Pans timeline right.

Segment Attributes Panel

Whenever the user creates a new segment, the user can assign properties for that segment by using the Segment Attributes panel 1440, 1540 (see FIGS. 14 and 15). This panel 1440, 1540 is visible by default when the user is on the Track Editor view 1400 or the Scene Builder view 1500. It will also appear whenever the user selects any segment so that the user can modify its existing properties, or when the user creates a new segment.

When the user first goes to this panel 1440, 1540, the first property that the user will need to set is the Track type 1452, 1552. After selecting a type, the user is presented with type-specific properties in addition to Start Time 1454, 1554, End Time 1556, 1556, and Tags 1458, 1558. For example, if the user selects the Appearance type, Actor and Character properties 1480, 1490 will be available. If the user changes the type to Vehicle, the Actor and Character properties will be removed. However, Type and Brand properties (not shown) will now be available. NOTE: If the user is in the Track Editor view 1400, and the user changes the Track type for a segment, it will be moved to the new Track view—and therefore will disappear from the current view. However, this does not mean the segment is deleted. For example, if the user is currently in Track Editor view 1400, editing Music tracks, and the user changes one of the segments to an Appearance track, that segment will not be present in the current view.

Setting Segment In-Out Points

Once a segment is created, there are several ways to set the precise frame that the user wishes to start and end that segment. The specific start and end times can be typed directly in the Segment Attribute panel 1440, 1540. Alternatively, as previously described, the start and end time points can be adjusted graphically by clicking and dragging the edges of the highlighted segment in the filmstrip 1418, 1518.

Merging and Splitting Segments

The user interfaces gives a user the ability to both combine multiple segments, and divide one segment into two. To split a segment, follow these steps:
1. Locate the segment that is desired to be split.
2. Select that segment. (Either by selecting it in the table 1410 in Track Editor view 1400, or by selecting the segment in the filmstrip 1418, 1518.)
3. Press the "Split" button 1425 (located at the bottom right of the interface 1400 of FIG. 14). NOTE: A split bar (not shown) should then appear in the middle of the selected segment in the filmstrip 1418. This bar will indicate the division point of the desired split.
4. By clicking and dragging on the split bar, the location and time point for dividing the segment can be chosen.
5. Pressing the "Split" button 1425 a second time sets the split point.

This results in two segments with duplicate attributes. As an example, if you began with a segment from 40:00-50:00 in a particular asset, and the split bar is set at 43:00, you will now have two segments: One from 40:00-43:00, and a second from 43:00-50:00.

The complement operation to this is "merging" segments. Merging allows the user to combine segments into bigger segments. The easiest way to combine segments is by selecting two (or more) adjacent segments, and pressing the Merge button 1427 (located at the bottom right of the interface 1400 of FIG. 14). Preferably, a few key things to note:
1. You cannot merge two segments if they are not adjacent (i.e. if there is a segment in between them).
2. You cannot merge segments if they do not share the same attributes. For example, you cannot merge a "Jennifer Aniston" segment with a "Julia Roberts" segment. However, you can merge segments that do share the same Tags.

Track Management

Figure 16:
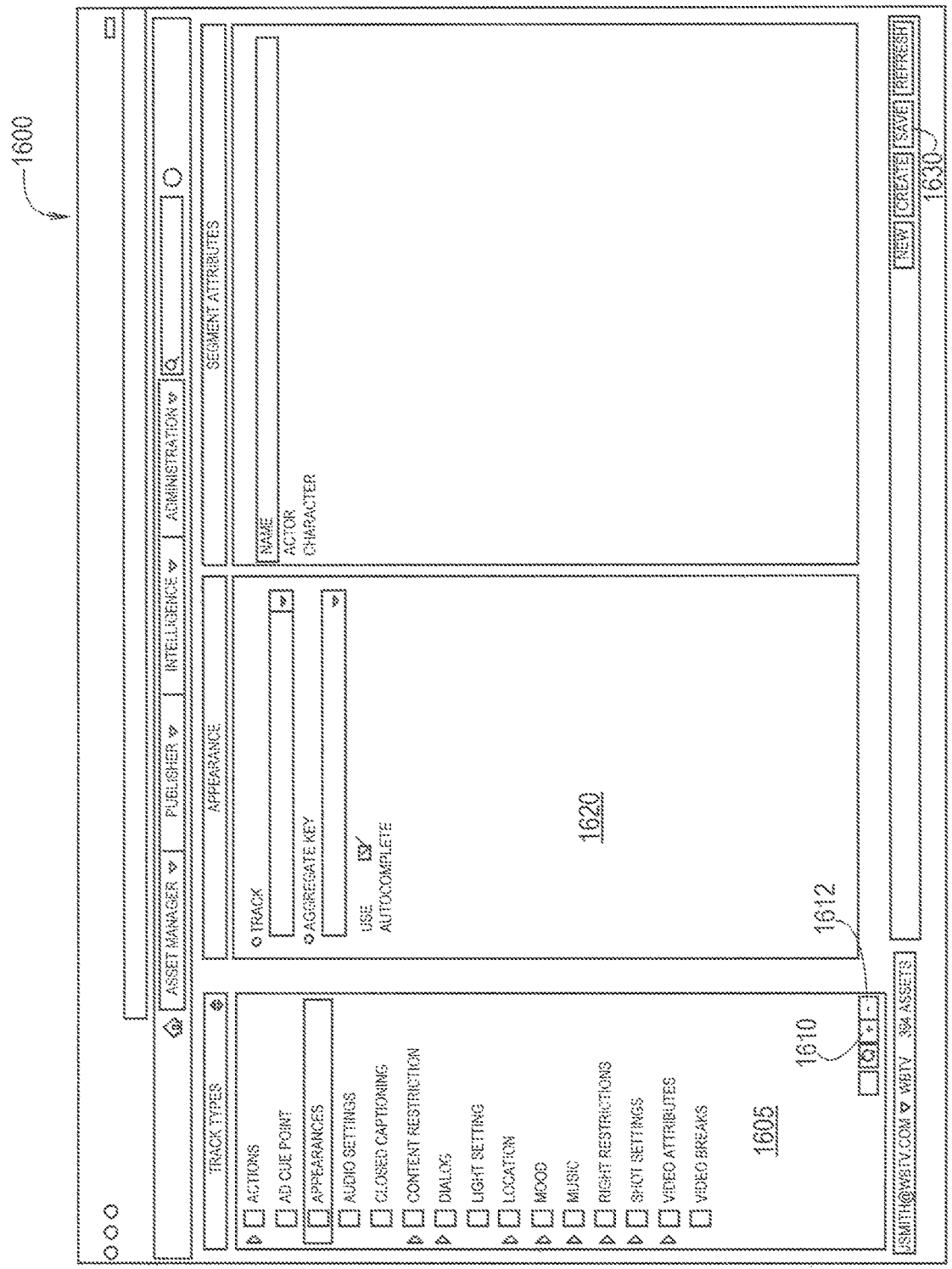

Customer administrators can manage the tracks and types available for adding to assets within the present system using interface 1600 of FIG. 16.

Add a Track Type: To add a new track type, the user can click on the "+" tab 1610 to show a blank track screen 1620. The user can select the type of track as a point in time track or a segment based track. Segment based tracks can have overlapping segments, or can enforce no overlaps. When the relevant track details have been entered, the user can click the Save button 1630 to create the track.

Remove a Track Type: To remove a track type, the user selects the track from the list 1605, and then clicks the "-" tab 1612. The user will then be prompted to confirm the delete, and the track will be removed. This will remove the track from the system so it cannot be added to any new assets, and will remove it and any associated segments from any assets that have that track associated with them.

Update Sub Tracks: For each track type, there is the option to add sub tracks. Sub tracks allow the user to group together data types to create a consolidated list of data. Example: Track Type of Objects can have sub-tracks called Vehicles, Food etc. . . .

Accordingly, it will be understood that various embodiments of the present invention described herein are preferably implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable to through wireless communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, game pad, satellite dish, scanner, or the like. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of screen shots, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

We claim:

1. A method comprising:
    receiving, from a server, first data used by a client device to generate for display a digital media asset in a film strip format representing one or more scenes of the digital media asset along a timeline, wherein each scene of the one or more scenes is associated with a respective point in time along the timeline of the digital media asset, wherein the timeline is defined by a start and an end time;
    receiving, from the server, second data used by the client device to generate for display a plurality of tracks, wherein each track of the plurality of tracks is indicative of a different type of metadata associated with the digital media asset and wherein the different types of metadata comprise metadata associated with the digital media asset in its entirety and metadata associated with a specific point or segment of time within the digital media asset;
    receiving, by the client device, a selection of a particular character from the plurality of tracks of the digital asset;
    in response to receiving the selection of the particular character from the plurality of tracks:
        performing facial recognition to identify a plurality of on-screen appearances of the selected particular character in the plurality of tracks of the digital asset;
        automatically associating the plurality of on-screen appearances of the selected particular character with metadata attributes and time-codes; and
        generating for simultaneous display both the digital media asset in the filmstrip format and one or more subtracks corresponding to the plurality of the on-screen appearance of the particular character in a non-contiguous manner based on the time-codes, wherein each subtrack comprises one or more associated non-contiguous time-coded segments that include the on-screen appearance of the same particular character as the particular track, wherein the generating for display comprises:
            displaying the one or more associated non-contiguous time-coded segments of the digital asset edited together to appear in a contiguous manner.

2. The method of claim 1, wherein each of the different type of metadata is created by an owner of the digital media asset, automatically generated by the server by applying at least one metadata generation mechanism to content of the digital media asset, or generated by a user.

3. The method of claim 1, wherein the start and end points of at least one of the one or more segments spans at least one of a time period of one scene, more than one scene, a portion of one scene, and portions of more than one scene.

4. The method of claim 1, further comprising receiving input indicating an edit to at least one segment of the plurality of tracks, the edit including adding, deleting, or changing the at least one segment.

5. The method of claim 2, wherein the at least one metadata generation mechanism includes face detection algorithm modules, ad break detection algorithm modules, speech recognition modules, or other automated metadata detection modules.

6. The method of claim 2, wherein access to generate for display the plurality of tracks in timeline alignment of the different type of metadata associated with the digital media asset on the client device is provided by an authorized user.

7. The method of claim 2, wherein the particular aspect of the different type of metadata occurring within each segment of the digital media asset is automatically generated by the owner by applying the at least one metadata generation mechanism, or generated by the user.

8. A non-transitory computer readable medium having instructions encoded thereon, that when executed by control circuitry causes the control circuitry to:
    receive, from a server, first data used by a client device to generate for display a digital media asset in a film strip format representing one or more scenes of the digital media asset digital media asset along a timeline, wherein each scene of the one or more scenes is associated with a respective point in time along the timeline of the digital media asset, wherein the timeline is defined by a start and an end time;
    receive, from the server, second data used by the client device to generate for display a plurality of tracks, wherein each track of the plurality of tracks is indicative of a different type of metadata associated with the digital media asset and wherein the different types of metadata comprise metadata associated with the digital media asset in its entirety and metadata associated with a specific point or segment of time within the digital media asset;
    receive, by the client device, a selection of a particular character from the plurality of tracks of the digital media asset; and
    in response to receiving the selection of the particular track from the plurality of tracks:
        perform facial recognition to identify a plurality of on-screen appearances of the selected particular character in the plurality of tracks of the digital asset;
        automatically associate the plurality of on-screen appearances of the selected particular character with metadata attributes and time-codes; and
        generate for simultaneous display both the digital media asset in the filmstrip format and one or more subtracks corresponding to the plurality of the on-screen appearance of the particular character in a non-contiguous manner based on the time-codes, wherein each subtrack comprises one or more associated non-contiguous time-coded segments that include the on-screen appearance of the same particular character as the particular track, wherein the generating for display comprises:

displaying the one or more associated non-contiguous time-coded segments of the digital media asset edited together to appear in a contiguous manner.

9. The non-transitory computer-readable medium of claim 8, wherein each of the different type of metadata is created by an owner of the digital media asset, automatically generated by the server by applying at least one metadata generation mechanism to content of the digital media asset, or generated by a user.

10. The non-transitory computer-readable storage medium of claim 8, wherein the start and end points of at least one of the one or more segments spans at least one of a time period of one scene, more than one scene, a portion of one scene, and portions of more than one scene.

11. The non-transitory computer-readable storage medium of claim 8, wherein the instructions further cause the control circuitry to receive input indicating an edit to at least one segment of the plurality of tracks, the edit including adding, deleting, or changing the at least one segment.

12. The non-transitory computer-readable storage medium of claim 9, wherein the at least one metadata generation mechanism includes face detection algorithm modules, ad break detection algorithm modules, speech recognition modules, or other automated metadata detection modules.

13. The non-transitory computer-readable storage medium of claim 9, wherein access to generate for display the plurality of tracks in timeline alignment of the different type of metadata associated with the digital media asset on the client device is provided by an authorized user.

14. The non-transitory computer-readable storage medium of claim 9, wherein the particular aspect of the different type of metadata occurring within each segment of the digital media asset is automatically generated by the owner by applying the at least one metadata generation mechanism, or generated by the user.

15. The method of claim 1, wherein the character is associated with an on-screen appearance of an actor.

16. The method of claim 15, wherein the metadata includes an identifier that is associated with the actor's name.

17. The method of claim 15, the one or more associated non-contiguous time-coded segments of the digital asset edited together to appear in a contiguous manner include the on-screen appearance of the same actor in a scene of the non-contiguous time-coded segment.

18. The method of claim 1, wherein the display of the one or more associated non-contiguous time-coded segments of the digital asset edited together to appear in a contiguous manner contains the same particular character in each contiguous segment.

* * * * *